United States Patent
Warren et al.

(10) Patent No.: US 7,441,237 B2
(45) Date of Patent: Oct. 21, 2008

(54) SYSTEM AND METHOD FOR EXTENDING A COMPILER THROUGH A COMPOSER

(75) Inventors: Matthew J. Warren, Redmond, WA (US); Barend H. Venter, Issaquah, WA (US); Wolfram Schulte, Bellevue, WA (US); Erik Meijer, Mercer Island, WA (US); Christopher J. Lovett, Woodinville, WA (US); Chia-Hsun Chen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 490 days.

(21) Appl. No.: 10/396,654

(22) Filed: Mar. 25, 2003

(65) Prior Publication Data
US 2004/0194068 A1    Sep. 30, 2004

(51) Int. Cl.
*G06F 9/44* (2006.01)
(52) U.S. Cl. ................................ 717/140; 717/146
(58) Field of Classification Search .............. 717/140, 717/146
See application file for complete search history.

(56) References Cited

U.S. PATENT DOCUMENTS

| | | | | |
|---|---|---|---|---|
| 6,063,133 A * | 5/2000 | Li et al. | ...................... | 717/136 |
| 6,182,281 B1 | 1/2001 | Nackman et al. | | |
| 6,189,019 B1 | 2/2001 | Blumer et al. | | |
| 6,209,124 B1 | 3/2001 | Vermeire et al. | | |
| 6,219,834 B1 * | 4/2001 | Soroker et al. | .............. | 717/145 |
| 6,378,126 B2 * | 4/2002 | Tang | .......................... | 717/143 |
| 6,408,431 B1 | 6/2002 | Heughebaert et al. | | |
| 6,457,172 B1 | 9/2002 | Carmichael et al. | | |
| 6,484,313 B1 | 11/2002 | Trowbridge et al. | | |
| 6,496,976 B1 * | 12/2002 | Smith et al. | .................. | 717/145 |
| 6,918,107 B2 * | 7/2005 | Lucas et al. | .................. | 717/124 |
| 2004/0168160 A1 * | 8/2004 | Zatloukal | .................... | 717/140 |

OTHER PUBLICATIONS

Thomas Lockhart, "PostgreSQL," [accessed Jun. 23, 2006], The PostgreSQL Development Team, retrieved from the Internet <URLs: http://www.uic.rsu.ru/doc/db/postgresql/postgres.htm and http://www.uic.rsu.ru/doc/db/postgresql/xfunc19254.htm>, (10 pages).*
Matthias Zenger and Martin Odersky, "Implementing Extensible Compilers," Jun. 2001, Workshop on Multiparadigm Programming with Object-Oriented Languages, Budapest, Hungary, (20 pages).*

* cited by examiner

*Primary Examiner*—Eric B Kiss
(74) *Attorney, Agent, or Firm*—Amin, Turocy & Calvin, LLP (57) ABSTRACT

A system and method for interfacing additional translation logic via composer(s) to a compiler to extend the capabilities of the compiler is provided. Generally, composer(s) can be software libraries that provide employment of componentization and polymorphism to compiler add-ons in order to extend compiler capabilities. One or more composers can be accessible to the compilation process by reference(s) made in a source code file. For example, additional translation logic for data types and/or expressions (e.g., markup language) created after compiler design can be made accessible to a compiler via composer(s), thus extending the existing compiler. The present invention mitigates problems associated with conventional compiler extending schemes and affords for compile code optimization without having to consider substantially all of the operations of a single query.

31 Claims, 9 Drawing Sheets

Prior Art

SYSTEM AND METHOD FOR EXTENDING A COMPILER THROUGH A COMPOSER

TECHNICAL FIELD

The present invention relates generally to compiling source code, and in particular to systems and methods for extending the capabilities of an existing program language compiler.

BACKGROUND OF THE INVENTION

Computers operate under the control of a program comprising coded, executable instructions. Typically, a program is first written as a textual representation of computer-executable instructions in a high-level language, such as BASIC, C, C++, C#, or the like, which are more readily understood by humans. A file containing a program in high-level language form is known as source code. The high-level language statements of the source code are then translated or compiled into the coded instructions executable by the computer. Typically, a software program known as a compiler is used for this purpose.

Typically, the source code of a programming language is formed of program constructs organized in one or more program units, such as procedures, functions, blocks, modules, projects, packages and/or programs. These program units allow larger program tasks to be broken down into smaller units or groups of instructions. High-level languages generally have a precise syntax or grammar, which defines certain permitted structures for statements in the language and their meaning.

A compiler is a computer program that translates source code into another language, such as object code executable by a computer or an intermediate language that requires further compilation to be executable. Typically, a compiler includes several functional parts. For example, a conventional compiler may include a lexical analyzer that separates the source code into various lexical structures of the programming language, known as tokens, such as may include keywords, identifiers, operator symbols, punctuation, and the like.

Compilers are generally implemented as closed, non-extendable systems. A typical means to extend a compiler is to redesign, or revise, the compiler and/or implement pre-processing steps to translate language extensions such as additional data structures into units recognizable to the compiler. However, compiler design revisioning and/or employing pre-processors are both limited by the data structures inherent to the compiler.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods to provide additional translation logic to programming language compiler(s) to compile source code that includes additional data type(s) and/or expression(s). The additional translation logic is provided via composer(s) which can be, for example, software libraries. Composer(s) can employ concepts such as componentization and/or polymorphism in order to extend compiler capabilities.

Conventionally, computer language compilers have been a closed system of rules that deterministically translate source code into executable code and/or equivalent representation. Typical means of extending the rules is generally achieved through specific revisions of the compiler and/or through pre-processors that translate an expanded set of language elements into usable input to the compiler. However, compiler revision and/or employment of pre-processor(s) are limited by the data structures inherent to the compiler.

The present invention mitigates problems associated with conventional schemes for extending the compiler(s) by providing a powerful mechanism for software developers to control and extend the behavioral characteristics, and specify unique behavior for entire regions of related operations. In addition, the present invention can be employed for optimization, thus mitigating having to consider substantially all of the operations of a single query in order to optimize the compiled code.

As noted supra, the systems and methods employ composers that comprise additional translation logic to extend existing compiler(s). Typically, composers are employed to perform translation step(s) for at least a portion (e.g., region) of the source code file under compilation, including source code comprising multiple languages and associated constructs.

Generally, one or more composers are introduced to the compilation process by references made in the source code file (e.g., SQL, C, C++ and C#) to programming element(s) such as data type(s) and/or expression(s) (e.g., XML expression queries, relational database queries and other markup language expressions) that are associated with the composer(s). Introduced composers negotiate with the compiler and/or other composers for translation rights over regions of the source code under evaluation. The composers are then employed to apply the translation logic of the composers to any assigned region of source code.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Figure 1:
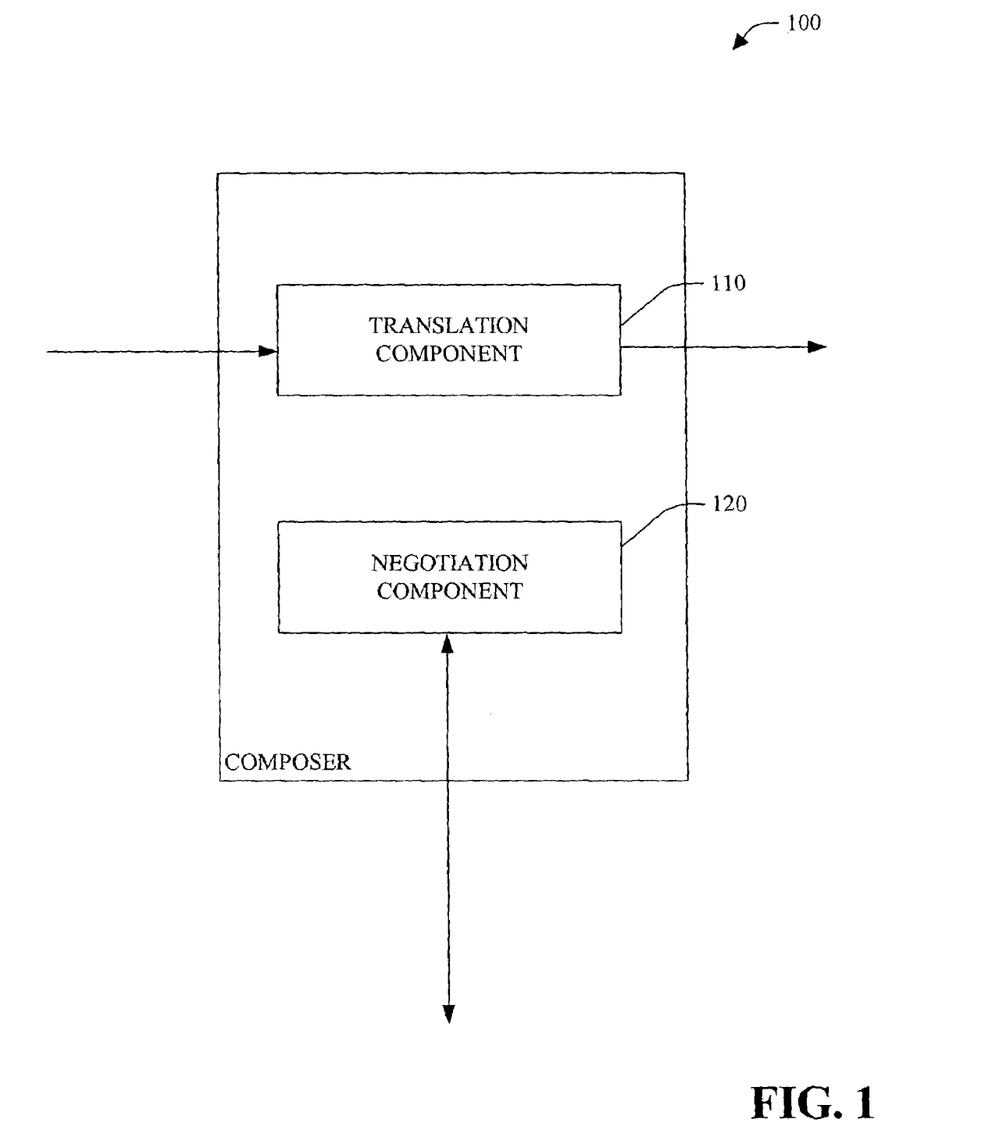
FIG. 1 is a block diagram of a composer in accordance with an aspect of the present invention.

Referring to FIG. 1, a composer 100 in accordance with an aspect of the present invention is illustrated. The composer 100 can be operatively coupled to a compiler (not shown) to extend capabilities and/or functionality of the compiler by providing the compiler with access to translation logic of the composer 100. The translation logic of the composer 100 provides translation step(s) that may not have been encompassed during the original design of the compiler. Thus, the composer 100 mitigates revision of the compiler and/or pre-processing in order to introduce additional data type(s) and/or expression(s).

The composer 100 can be a software library that extends the capabilities of the compiler through componentization and/or polymorphism. Generally, a composer 100 is introduced to the compilation process by a reference made in a source code file (e.g., based on a general purpose programming language, scripting language and/or markup language) to programming element(s) (e.g., data type(s) and/or expression(s)) that are associated with the composer 100. The introduced composer 100 negotiates with the compiler and other composer(s) 100 for translation rights over region(s) of the source code file. The composer 100 then employs translation logic to assigned region(s) of the source code file.

In one example, the region of the source code file can be defined through an iterative process. For example, the composer 100 and/or the compiler may not claim a particular expression under evaluation. The expression can then be expanded into a larger expression, wherein the composer(s) 100 can claim the rights to the larger expression. Several iteration(s) of expansion may occur, wherein a successively larger region of the source code file are identified, for example, until the composer 100 and/or the compiler obtains a right to compile the region of the source code file. It is to be appreciated that other iterative techniques and non-iterative techniques (e.g., pattern recognition) can also be employed to identify region(s) of the source code file to be translated by the composer 100.

Utilization of the composer 100 mitigates problems associated with conventional schemes for extending rules of a compiler by providing a powerful mechanism for software developers to control and extend the behavioral characteristics and/or specify unique behavior for entire region(s) of related operation(s).

The composer 100 can be employed for optimization via overloading translation of statement(s) of query operation(s) such as database record retrieval and/or the filtering of program data. Typically, a single query operation can comprise multiple operations such as filtering, ordering and/or projection. Thus, the composer 100 can mitigate having to consider substantially all of the operations of a single query in order to optimize the compiled code.

The composer 100 comprises a translation component 110 and a negotiation component 120. The translation component 110 translates at least a region of the source code file based, at least in part, upon translation logic.

The negotiation component 120 couples the composer 100 with the compiler. The negotiation component 120 and the compiler negotiate translation rights over the region of the source code file. In one example, the negotiation component 120 is coupled to a second composer (not shown). The negotiation component 120 negotiates with the second composer for translation rights over the region of the source code file.

The following examples illustrate the employment of additional translation logic in accordance with an aspect of the present invention. The following examples are provided for clarity, and do not limit the scope of the invention. It is to be appreciated that more, less, additional and/or different translational logic can be employed in accordance with the invention. The examples include data types, data types with operator overloads, and expressions.

In one aspect of the present invention, a developer can create a new data type, "A," for a compiler that has already been designed. The data type "A," for example, can include method overloading and/or expression evaluation that may not be employed by the compiler. Traditionally, the compiler would have to be revised and/or pre-processing of the "A" data type would have to be performed in order to compile the "A" data type with the existing compiler(s). However, the present invention allows the developer to create a composer 100 (e.g., software library having translation logic) for "A" data type and any associated routine(s). The composer 100 can then be made accessible to the compiler (e.g., via a registry system and/or explicit inclusion of composer 100 within source code file). When the compiler encounters data type "A" within the source code file, the composer 100 can be invoked to compile a region of the source code filing comprising data type "A". Thus, the present invention mitigates having to revise the compiler and/or code and invoke a pre-processor in order to extend the capabilities of the existing compiler, for example to compile additional data type(s).

In another aspect of the present invention, a new type, "MyType," can be associated with an overloaded (e.g., overridden) operator. The developer can extend the compiler to compile operand(s) of type "MyType" and employ the operator overload by creating a composer 100, and allowing the compiler to access the composer 100. When an operand of type "MyType" is encountered, the composer 100 can be invoked, wherein the operator overload can be employed, and the "MyType" operand and the overloaded operator can be compiled. Thus, the composer 100 can facilitate overloading a sequence and/or combination of operators at the same time, and, to give that sequence and/or combination a new specific meaning.

In yet another aspect of the present invention, a new type, "MyBlock," can be associated with an expression, or region of a source code file. The expression can include one or more data types, and one or more operators that can be overloaded wherein the order of operator precedence can be altered, for example. The developer can extend a compiler to compile "MyBlock" type(s) by creating a composer 100 for "MyBlock" types, and allowing the compiler access to the composer 100. When an expression of type "MyBlock" is provided to the compiler, the composer 100 can be invoked to compile the "MyBlock" expression. Examples of suitable expressions in accordance with an aspect of the present invention include embedded XML expression(s), XML expression queries and/or relational database queries.

While FIG. 1 is a block diagram illustrating components for the composer 100, it is to be appreciated that the composer 100, the translation component 110 and/or the negotiation component 120 can be implemented as one or more computer components, as that term is defined herein. Thus, it is to be appreciated that computer executable components operable to implement the composer 100, the translation component 110 and/or the negotiation component 120 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and MEMORY STICK in accordance with the present invention.

Figure 2:
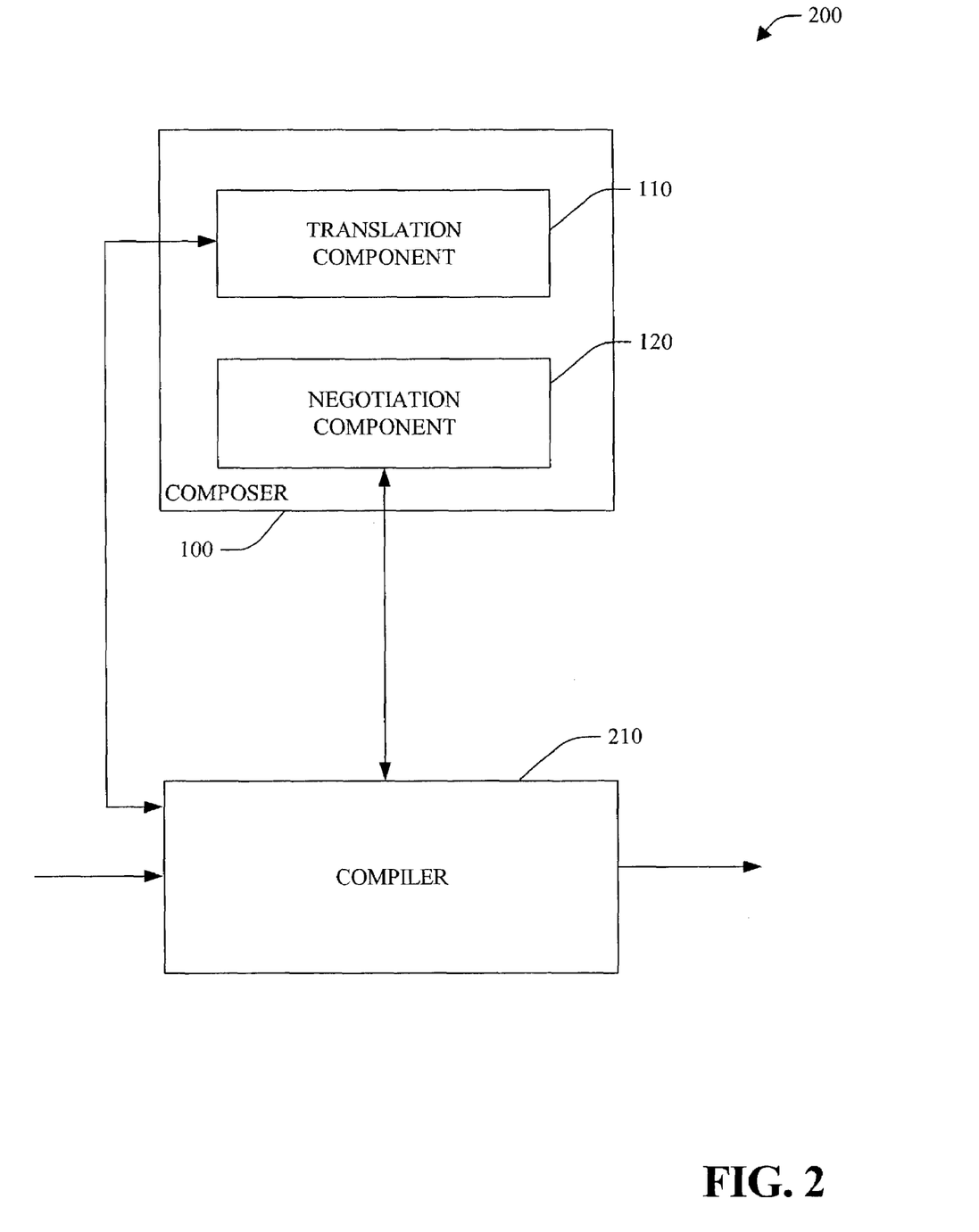
FIG. 2 is a block diagram of a compiler extension system in accordance with an aspect of the present invention.

Turning to FIG. 2, a compiler extension system 200 in accordance with an aspect of the present invention is illustrated. The system 200 comprises a composer 100 and a compiler 210. The composer 100 is coupled to the compiler 210 to extend capabilities and/or functionality of the compiler 210 by providing the compiler 210 with access to translation logic of the composer 100. The translation logic of the composer 100 provides translation step(s) that may not have been encompassed during the original design of the compiler 210.

The compiler 210 can receive a source code file (e.g., multi-language) to be compiled. The composer 100 can be introduced to the compilation process directly (e.g., by explicit inclusion) and/or indirectly (e.g., by referring to a data type and/or expression recognized by the composer 100). During the compilation process, the compiler 210 negotiates with the negotiation component 120 of the composer with regard to region(s) of the source code file.

After successful negotiation of a region of the source code file by the negotiation component 120, the translation component 110 receives the region of the source code file and translates the region. The translation component 110 then provides information associated with the translated region of the source code file to the compiler 210 (e.g., intermediate representation (IR) of the region and/or abstract syntax tree).

It is to be appreciated that the system 200 and/or the compiler 210 can be computer components as that term is defined herein.

Figure 3:
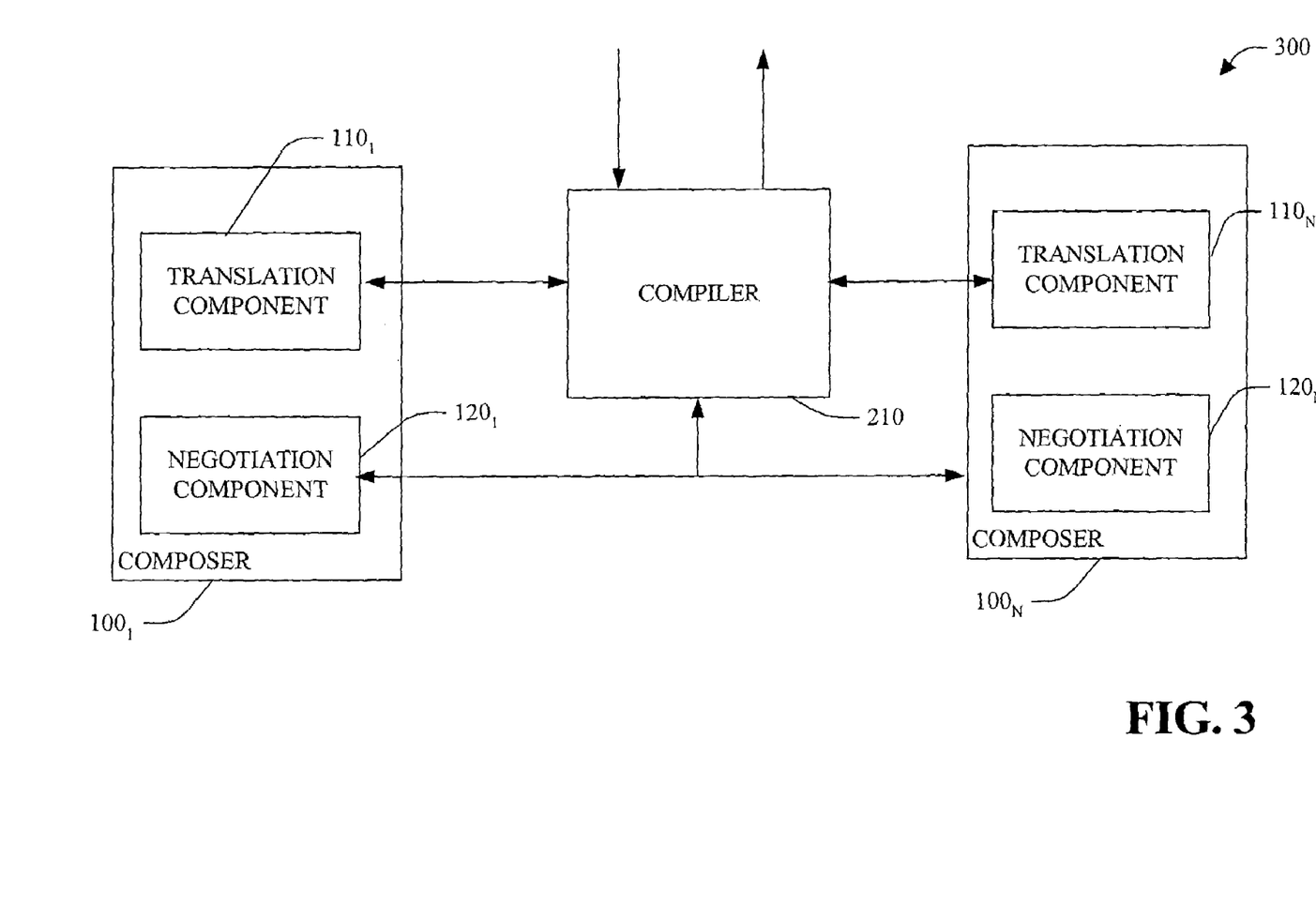
FIG. 3 is a block diagram of a compiler extension system in accordance with an aspect of the present invention.

Next, referring to FIG. 3, a compiler extension system 300 in accordance with an aspect of the present invention is illustrated. The system 300 comprises a compiler 210 and a first composer $100_1$ through an Nth composer $100_N$, N being an integer greater than or equal to one. The first composer $100_1$ through the Nth composer $100_N$ can be referred to collectively as the composer(s) 100.

The composer(s) 100 can be employed to facilitate compiling a source code file by extending the capabilities of the compiler 210 coupled to the composer(s) 100. In one aspect of the present invention, the composer(s) 100 can be utilized to perform additional translation step(s) during compilation for at least a portion (e.g., region) of the source code file. In another aspect of the present invention, the composer(s) 100 can be utilized to perform different translation step(s) during compilation. For example, the composer(s) 100 can facilitate overloading an operator and/or a method to provide a different meaning for the operator and/or the method depending on context (e.g., the ability to redefine method(s) for derived class(es), given a base class).

The compiler 210 can translate source code into object code for various platform(s) (e.g., target processor(s) and/or operating system(s)). The compiler 210 accepts and translate the source code file, interacts with the composer(s) 100, and outputs an intermediate representation of the source code file. The compiler 210 can optionally perform error checking during compilation, as described in below. The compiler 210 interacts with the composer(s) 100 for negotiation of whether the compiler 210 or the composer(s) 100 will translate a portion (e.g., a block, group and expression) of the source code file, and can invoke the composer(s) 100 during the compilation process.

Generally, a source code file is provided to the compiler 210 for compilation. The compiler 210 evaluates the source code file and facilitates generation of an intermediate representation of the source code file. As source code is evaluated, the compiler 210 and the composer(s) 100 can negotiate translation rights for portion(s) of the source code file. In one aspect of the present invention, a source code file causes the compiler 210 to determine whether at least one of the composer(s) 100 can compile a portion of the source code file. For example, a data type and/or expression (e.g., XML query) created after the design of the compiler 210 may be encountered. If at least one of the composer(s) 100 claims the rights to translate the portion of source code file, then the composer(s) 100 can be employed to translate the portion of source code file.

It is to be appreciated that the source code file can be compiled utilizing a combination of compilers 210 and composer(s) 100. For example, as the source code file is received and evaluated, translation rights can be resolved, and a portion of the source code file can be compiled by the compiler 210 and another portion can be complied by composer(s) 100.

As an example, the compiler 210 can receive the exemplary expression "A+B×C." The exemplary expression "A+B×C" can be variously interpreted depending on the context, for example whether A, B and C are integers or complex data structures. After evaluating the data type, or class, to determine the compilation mechanism, the compiler 210 and/or composer(s) 100 can be employed to compile the source code. In one aspect of the present invention, the additional translation logic of the composer(s) 100 can vary the order of operator precedence. For example, multiplication is typically performed prior to addition, unless parentheses or other mechanism is utilized to change the order of operation. However, the overloaded operator associated with the data type may define addition at a higher level of precedence than multiplication. When a data type associated with a pattern of addition/multiplication is received and recognized, the composer(s) 100 can invoked to compile the expression.

It is to be appreciated that the system 300 can be a computer component as that term is defined herein.

Figure 4:
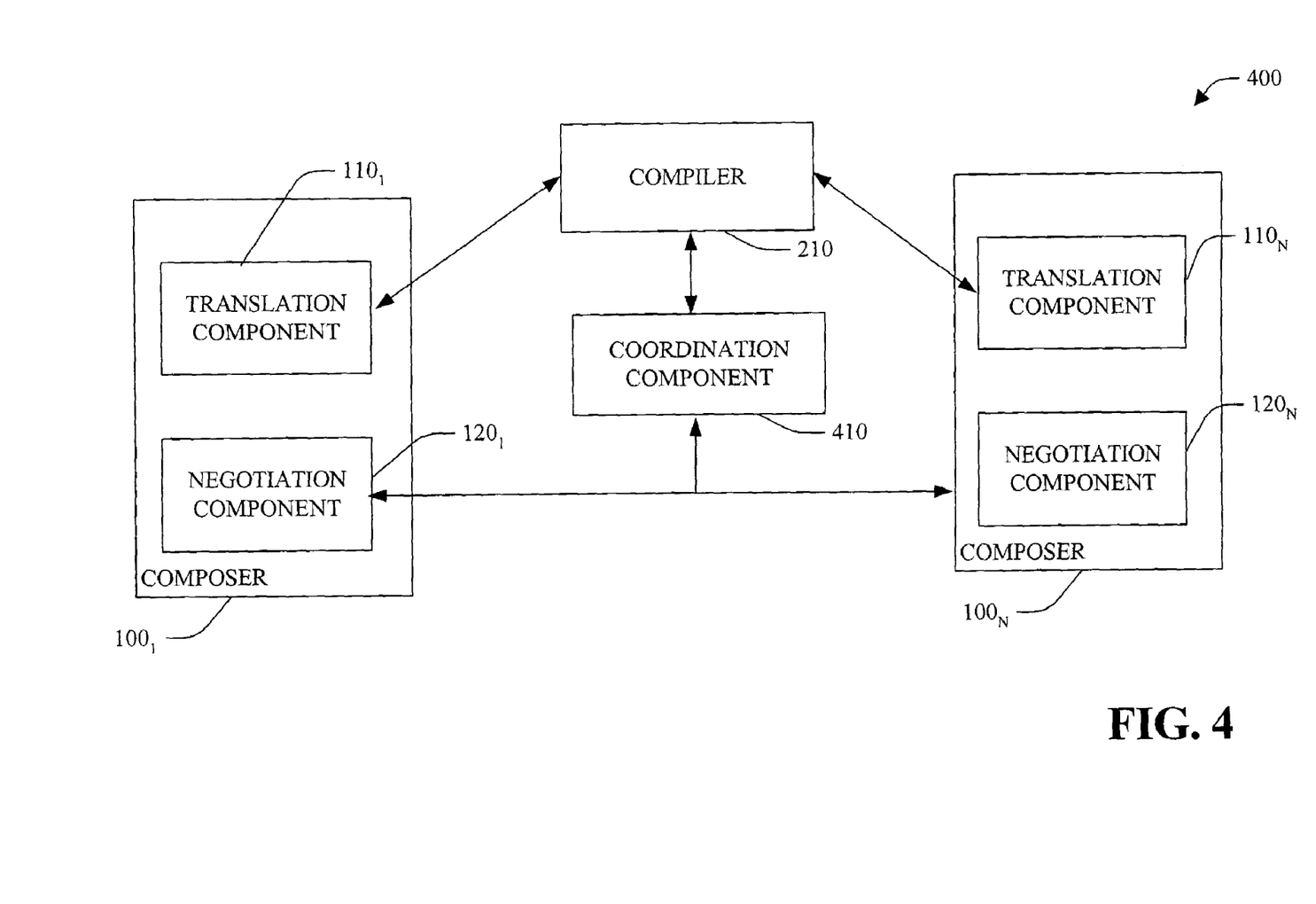
FIG. 4 is a block diagram of a compiler extension system in accordance with an aspect of the present invention.

Turning to FIG. 4, a compiler extension system 400 in accordance with an aspect of the present invention is illustrated. The system 400 comprises a compiler 210, composer(s) 100 and a coordination component 410.

The composer(s) 100, as described previously, can be employed to extend the capabilities of the compiler 210 by providing accessible software libraries with compile-time translation logic. For example, the translation logic can provide additional translation steps for data types and/or expressions that were created after the design of the compiler 210.

Composer(s) 100 are generally identified during compilation by reference(s) in the source code to programming elements like data type(s) and/or expression(s) that are associated with the composer(s) 100. Then, the composer(s) 100 and the compiler 210 negotiate for translation rights over region(s) of the source code under evaluation. The composer(s) 100 are then employed to apply the translation logic of the composer(s) 100 to any assigned region of source code.

The coordination component 410 can provide an interface between the composer(s) 100 and the compiler 210, and can employ logic to facilitate determining the whether the compiler 210 and/or a particular composer 100 is to translate (e.g., compile) particular region(s) of a source code file.

For example, the coordination component 410 can facilitate interaction between the composer(s) 100 and the compiler 210. The interaction can include the compiler 210 accessing the additional translation logic of the composer(s) 100 during source code compilation. In addition, the interaction can include determining whether the composer(s) 100 (including which of the composer(s) 100) and/or the compiler 210 will be employed to compile a portion of source code.

The coordination component 410 can facilitate determination of whether the composer(s) 100 and/or the compilers 210 will be employed to compile a particular region of a source code file. For example, the coordination component 410 can employ a learning mechanism (e.g., neural networks and probability theory based) wherein the results of an iteration to determine whether the composer(s) 100 and/or the compilers 210 will be employed are stored and utilized during a successive iteration.

For example, common patterns and/or associations can be detected based at least in part on past determination(s) in order to make a "best guess" of the translation logic that will be employed for a portion of source code. When more than one composer(s) 100 are employed, the learning mechanism of the coordination component 410 can expedite locating the composer 100 by initially interacting with the "best guess" composer 100. In another aspect of the present invention, the learning mechanism can be employed to determine the likelihood that newly added translation logic will be employed rather than previously added translation logic. For example, information associated with the "best guess" can be compared with an indicator to determine if the likelihood of the "best guess" is reasonable.

Additionally and/or alternatively, the coordination component 410 can provide a registry of composer(s) 100 available for use by the system 400. The registry can provide, for example, a hierarchical ranking of composer(s) 100. For example, a particular expression can be recognized by a plurality of composer(s) 100; however, based upon their ranking in the coordination component 410, translation rights over the particular expression can be determined by the coordination component 410.

In another aspect of the present invention, the coordination component 410 can receive a source code file. The coordination component 410 can then utilize similar learning mechanism(s) and/or a hierarchical registry as described above to facilitate determining translation rights over region(s) of the source code file, that is, whether the composer(s) 100 and/or the compiler 210 will be employed to translate the particular region of the source code file. The coordination component 410 can then invoke the translation logic of the composer(s) 100 and/or the compiler 210 and provide the source code to the composer(s) 100 and/or the compiler 210.

In one example, the coordination component 410 is a component of the composer(s) 100 and/or the compiler 210. It is to be appreciated that the system 400 and/or the coordination component 410 can be computer components as that term is defined herein.

Figure 5:
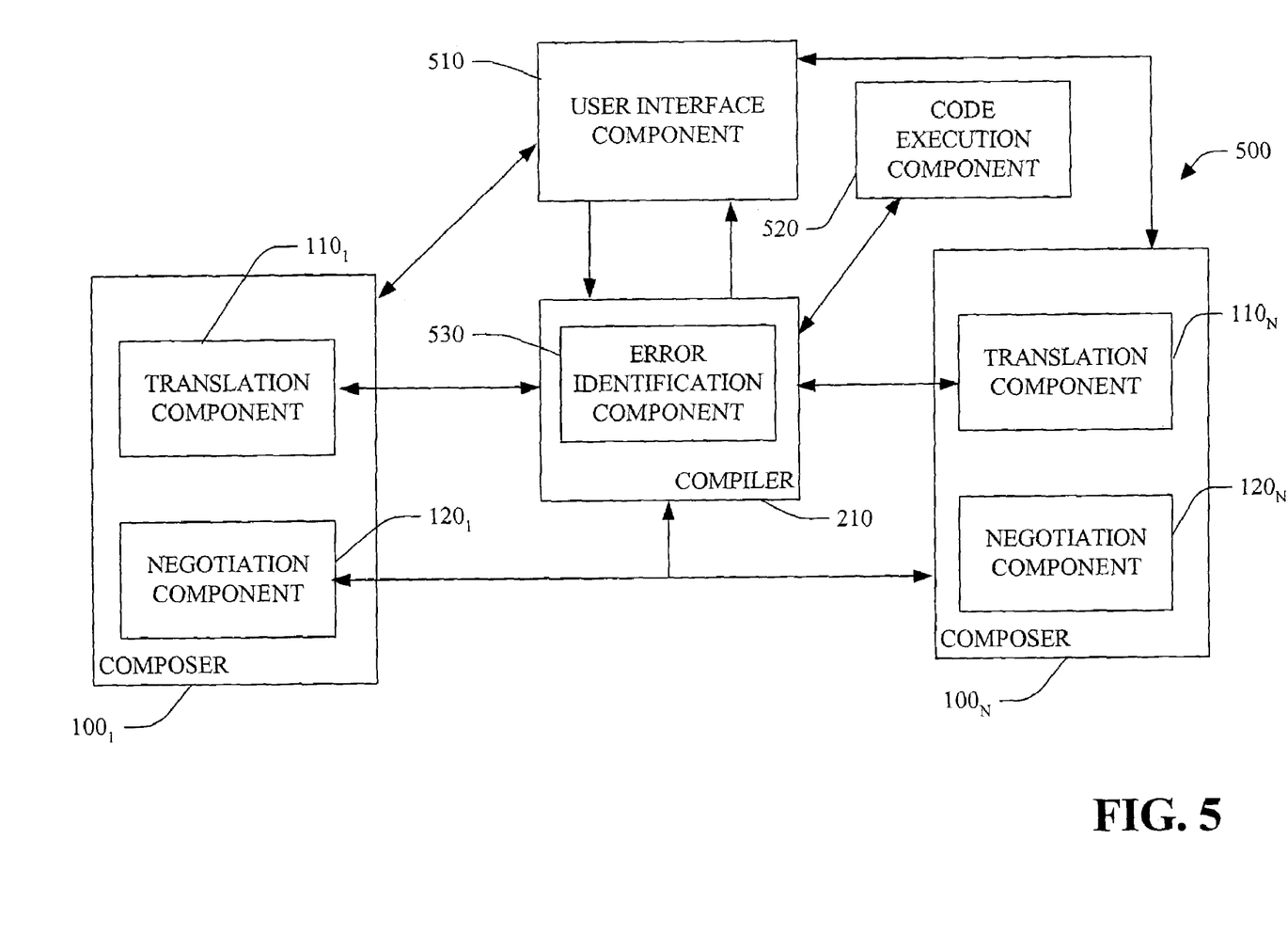
FIG. 5 is a block diagram of a compiler extension system in accordance with an aspect of the present invention.

Next, referring to FIG. 5, a compiler extension system 500 in accordance with an aspect of the present invention is illustrated. The system 500 comprises composer(s) 100, compiler 210 and a user interface component 510. Optionally, the system 500 can include a code execution component 520.

A developer creating new data type(s) and/or expression(s) can interact with the composer(s) 100 via the user interface component 510 in order to provide, alter and/or remove library(ies) of translation logic associated with the newly created type(s) and/or expression(s). For example, the developer can provide and/or modify logic for testing and/or deployment. After the logic is made accessible to the compiler 210, the developer can invoke the compiler 210 via the user interface component 510 and provide the compiler 210 with a source code file that utilizes the new data type(s) and/or expression(s).

The compiler 210 can then evaluate the source code file. The compiler 210 may be able to compile portion(s) of the source code and invoke the composer(s) 100 to provide additional translation logic to translate other portion(s) of the source code file. Various mechanism(s) can be utilized to determine whether the compiler 210 and/or the composer(s) 100 will be employed to compile the source code as discussed previously. For example, the compiler 210 can detect a new, unrecognized and/or additional data type and/or expression, and then negotiate with the composer(s) 100 to determine translation rights over the data type and/or expression. In another aspect of the present invention, several iterations can occur wherein successively larger regions of source code are identified, and after each iteration it is determined whether at least one of the composer(s) 100 and/or the compiler 210 can compile the region. For example, once a composer 100 and/or the compiler 210 receives rights to compile the region of source code, then the iterations are halted.

Optionally, the compiler 210 can include error identification component 530. The error identification component 530 can facilitate compile-time error checking. For example, the error identification component 530 can provide compile-time error checking (e.g., type mismatch) and additional error checking for the translation logic of the composer(s) 100. For example, a data type can be received by the compiler 210 wherein associated translation logic has been included in the composer(s) 100. The error identification component 530 can include routine(s) to facilitate determining whether translation logic is accessible via the composer(s) 100 and/or the compiler 210. The error identification component 530 can provide information associated with compile-time error checking to the user interface component 510.

It is to be appreciated that the error identification component 530 can be configurable to provide a mechanism to determine the degree, if any, of error checking to perform. When error checking is employed, the error identification component 530 can provide the results to the developer via the user interface component 510. The results can be employed for debugging and/or validation, for example.

The code execution component 520 can be employed to run (e.g., execute) the intermediate representation of the source code file generated the by compiler 210 and/or the composer(s) 100. For example, the code execution component 520 can return the results to the developer via the user interface component, thus enabling the developer to debug and/or validate the new type and/or expression.

In one aspect of the present invention, the developer can employ the system 500 for developing new type(s) and/or expression(s), and the associated translation logic. In another aspect of the invention, the developer can develop new type(s) and/or expression(s), and the associated translation logic, for utilities for other developer(s). In yet another aspect of the present invention, the developer can develop new type(s) and/or expression(s), and the associated translation logic, for a user application.

It is to be appreciated that the system 500, the user interface component 510, the code execution component 520 and/or the error identification component 530 can be computer components as that term is defined herein.

Figure 6:
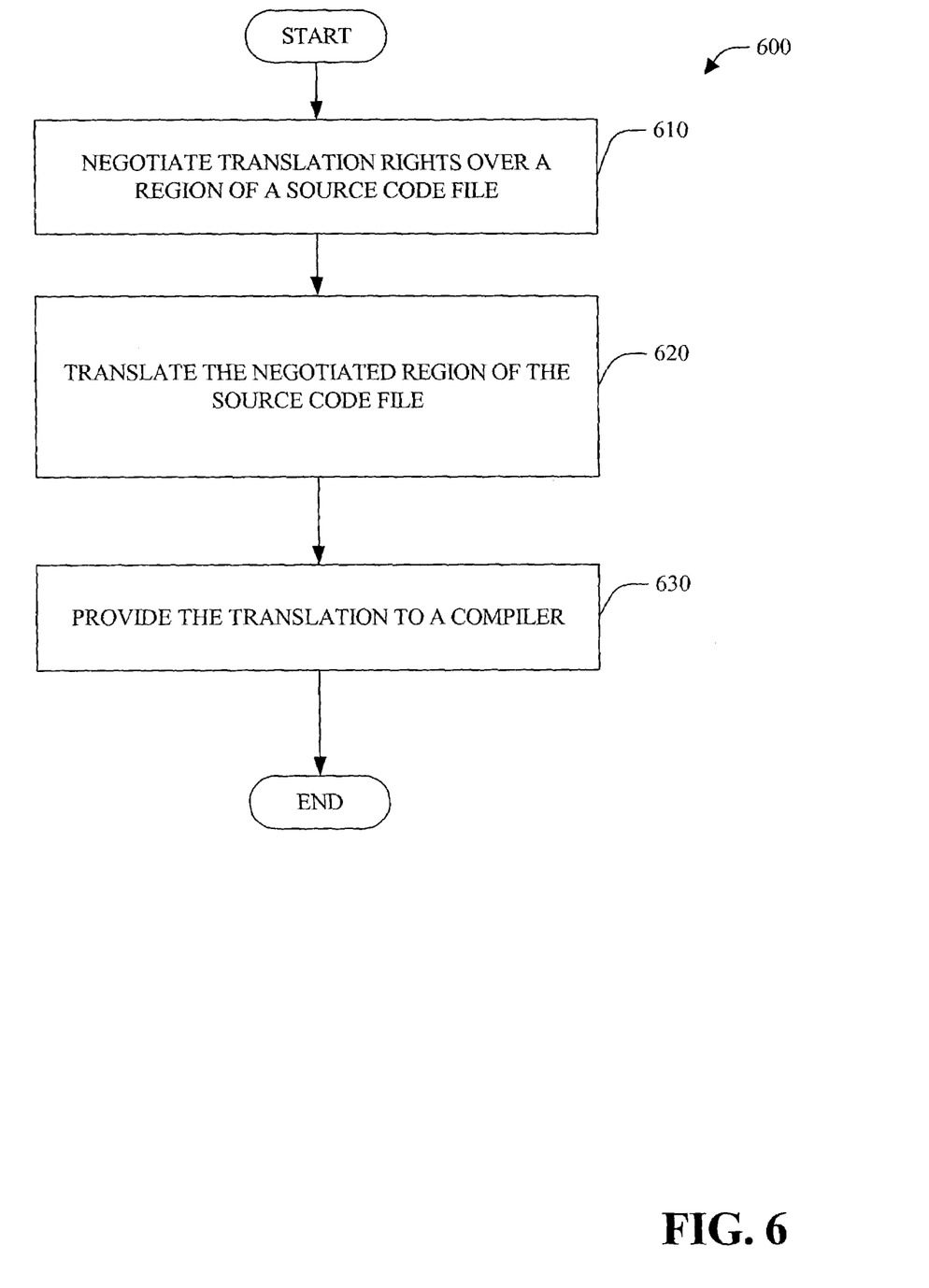
FIG. 6 is a flow chart of a method for extending the compilation capabilities of a compiler in accordance with an aspect of the present invention.
Figure 7:
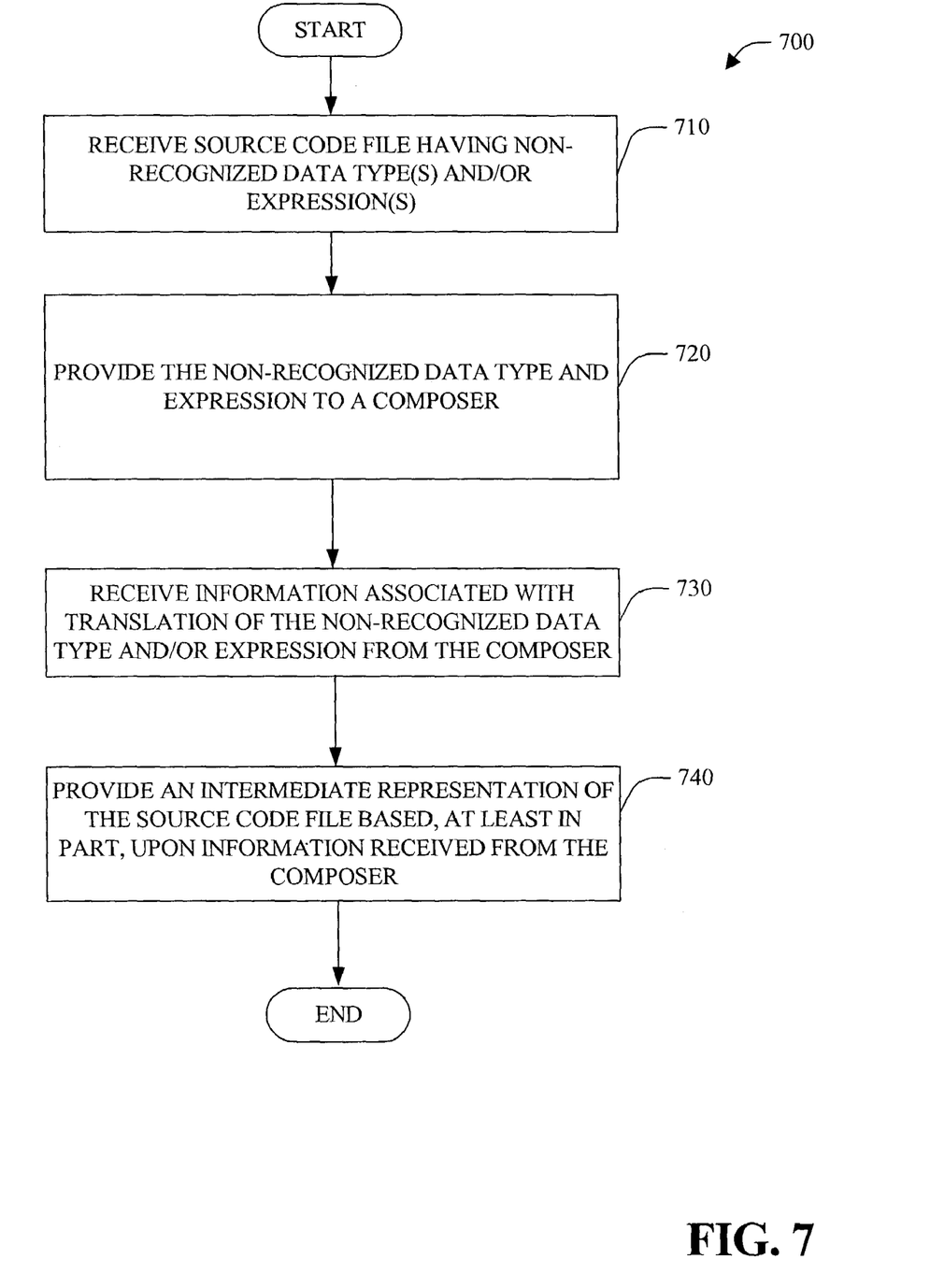
FIG. 7 is a flow chart of a method of compiling a source code file in accordance with an aspect of the present invention.
Figure 8:
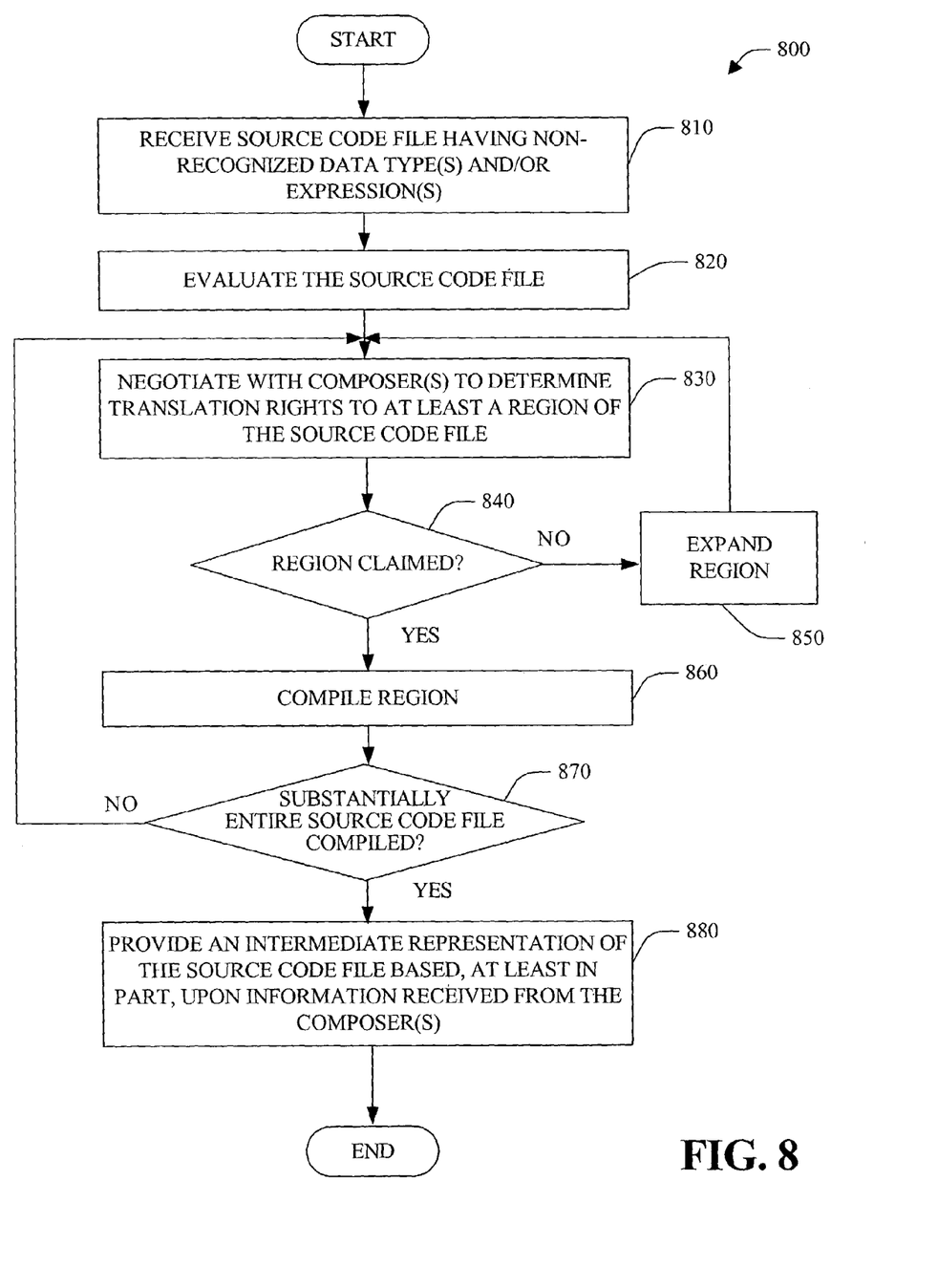
FIG. 8 is a flow chart of a method of compiling a source code file in accordance with an aspect of the present invention is illustrated.

Turning to FIGS. 6, 7 and 8, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 6, a method 600 for extending the compilation capabilities of a compiler in accordance with an aspect of the present invention is illustrated. At 610, translation rights over a region of a source code file are negotiated (e.g., between a compiler 210 and a composer 100). For example, the negotiated region can include an embedded XML expression, an XML expression query and/or a relational database query. At 620, the negotiated region of the source code file is translated. At 630, the translation is provided to a compiler (e.g., compiler 210).

For example, the translation can be based, at least in part, upon additional logic associated with at least one of an additional data type and expression, and/or, an operator overload. The method 600 can be employed, for example, to optimize overloading translation of a statement of a query operation (e.g., a database record retrieval and/or a filtering of program data).

The method 600 mitigates having to revise the compiler and/or provide preprocessing in order to introduce additional data type(s) and/or expression(s). In addition, the method 600 mitigates problems associated with conventional schemes for extending rules of a compiler by providing a powerful mechanism for software developers to control and extend the behavioral characteristics, and specify unique behavior for region(s) of related operation(s). Furthermore, the method 600 can be employed for optimization via overloading the translation of statements of query operations such as database record retrieval and/or the filtering of program data, thus mitigating having to consider substantially all of the operations of a single query in order to optimize the compiled code.

Turning next to FIG. 7, a method 700 of compiling a source code file in accordance with an aspect of the present invention is illustrated. At 710, a source code file having non-recognized data type(s) and/or expression(s) is received. The source code file can be multi-lingual (e.g., comprise of various programming language(s)), and contain data type and/or expressions, including markup language (e.g., XML) expression queries and relational database queries, that were created after the design of the compiler. The non-recognized data type(s) and/or expression(s) can include, for example, an embedded XML expression, an XML expression query and/or a relational database query.

At 720, the non-recognized data type(s) and/or expression(s) are provided to a composer (e.g., composer 100). For example, translation rights to the data type(s) and/or expression(s) can be negotiated with composer(s) (e.g., composer(s) 100). Additionally and/or alternatively, translation rights can be negotiated through an iterative process, wherein successively larger regions of the source code file are identified (e.g., until the composer claims translation rights to the region).

At 730, information associated with translation of the non-recognized data type(s) and/or expression(s) is received from the composer. At 740, an intermediate representation of the source code file is provided based, at least in part, upon information received from the composer.

Next, referring to FIG. 8, a method 800 of compiling a source code file in accordance with an aspect of the present invention is illustrated. At 810, a source code file having non-recognized data type(s) and/or expression(s) is received. The non-recognized data type(s) and/or expression(s) can include, for example, an embedded XML expression, an XML expression query and/or a relational database query. At 820, the source code file is evaluated.

At 830, translation rights to at least a region of the source code file is negotiated with composer(s). At 840, a determination is made as to whether the region has been claimed (e.g., by the compiler and/or a composer). If the determination at 840 is NO, at 850, the region is expanded and processing continues at 830. If the determination at 840 is YES, at 860, the region is compiled. If the compiler can compile the region and a composer does not claim the region of source code file, then the compiler is employed to compile the region of the source code. If a composer claims translation rights to the region, then the composer is employed to compile the region of the source code file.

At 870, a determination is made as to whether substantially the entire source code file has been compiled. If the determination at 870 is NO, processing continues at 830. If the determination at 870 is YES, at 880, an intermediate representation of the source code file is provided based, at least in part, upon information received from the composer(s).

Figure 9:
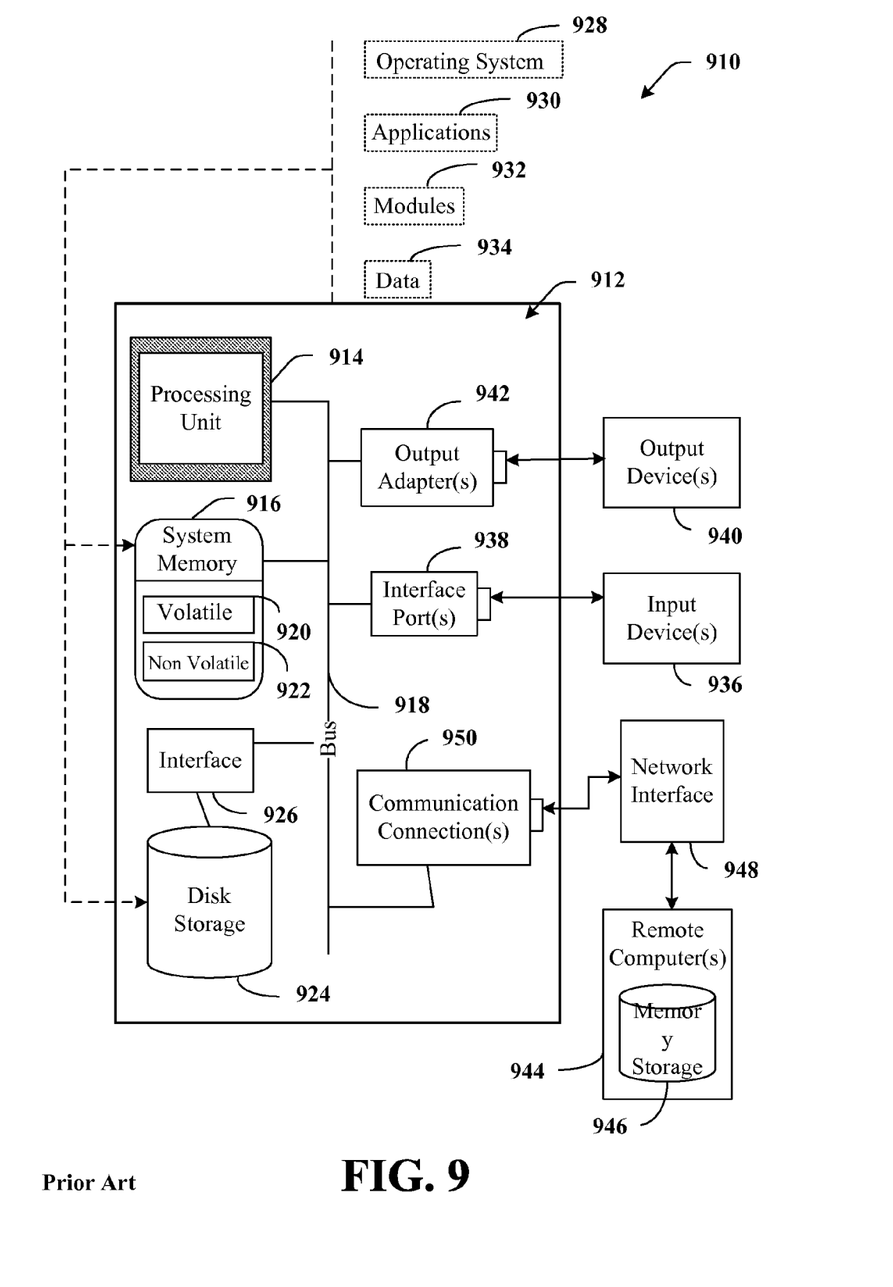
FIG. 9 illustrates an example operating environment in which the present invention may function.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multi-processor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, JAZ drive, ZIP drive, LS-100 drive, flash memory card, or MEMORY STICK. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or nonremovable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented composer stored in computer memory that provides additional translational logic to a programming language compiler comprising the following computer executable components:
   a translation component that translates at least a region of a source code file based, at least in part, upon translation logic; and,
   a negotiation component that couples the composer with the compiler when the compiler encounters a data type associated with the composer within the region of the source code file, wherein the negotiation component and the compiler negotiate translation rights over the region of the source code file.

2. The composer of claim 1, the translation component comprising a library that stores at least some of the translation logic.

3. The composer of claim 1, the translation logic based, at least in part, on at least one of componentization and polymorphism.

4. The composer of claim 1, the translation logic employed to extend compilation capability of the compiler by at least one of overloading an expression, facilitating an additional expression and facilitating an additional data type.

5. The composer of claim 1, the source code file comprising at least one of a general purpose programming language and a scripting language.

6. The composer of claim 1, the source code file comprising a general purpose programming language and a scripting language.

7. The composer of claim 1, the source code file comprising a markup language.

8. The composer of claim 1, wherein the composer is introduced to a compilation process by a reference in the source code file to a programming element associated with the composer.

9. The composer of claim 8, the reference comprising at least one of a data type and an expression.

10. The composer of claim 1, the region of the source code identified through an iterative process, wherein a successively larger region of the source code file is identified.

11. The composer of claim 1, the region of the source code identified through a non-iterative technique.

12. The composer of claim 11, the non-iterative technique comprising pattern recognition.

13. The composer of claim 1, the negotiation component further coupled to a second composer, wherein the negotiation component negotiates with the second composer for translation rights over the region of the source code file.

14. A compiler extension system stored in a computer memory that provides additional translational logic to a programming language compiler comprising the following computer executable components:
   a compiler that receives a source code file and provides an intermediate representation of the source code file; and,
   a composer comprising a translation component that translates at least a region of the source code file based, at least in part, upon translation logic, and, a negotiation component that couples the composer with the compiler when the compiler encounters a data type associated with the composer within the region of the source code file, the negotiation component and the compiler negotiate translation rights over the region of the source code file;
   wherein the intermediate representation of the source code file is based, at least in part, upon translation of the region by the composer.

15. The system of claim 14, the composer comprising one or more libraries of translation logic.

16. The system of claim 14, the source code file comprising at least one of a general purpose programming language and a scripting language.

17. The system of claim 14, the source code file comprising a general purpose programming language and a scripting language.

18. The system of claim 14, the source code file comprising a markup language.

19. The system of claim 14, the compiler further comprising an error identification component that facilitates compile-time ettor identification of the source code file.

20. The system of claim 14, further comprising a coordination component that facilitates determination of translation rights over the region of the source code file.

21. The system of claim 14, further comprising a user interface component that facilitates interaction with a developer of at least one of the composer and the source code file.

22. A method for extending the compilation capabilities of a compiler utilized to provide additional translation logic to a programming language executed by a computer, comprising:
   negotiating translation rights over a region of a source code file;
   coupling a composer with the compiler when the compiler encounters a data type associated with the composer within the region of the source code file;
   translating the negotiated region of the source code file to provide an intermediate representation of the source code file; and
   compiling the intermediate representation of the source code file to a computer executable form.

23. The method of claim 22, translation being based, at least in part, upon additional logic associated with at least one of an additional data type and expression.

24. The method of claim 22, translation being based, at least in part, upon an operator overload.

25. The method of claim 22, employed to optimize overloading translation of a statement of a query operation.

26. The method of claim 25, the statement of a query operation comprising at least one of a database record retrieval and a filtering of program data.

27. A method of compiling a source code file executed by a computing device, comprising:
   receiving the source code file, the source code file comprising at least one non-recognized data type or expression;
   associating the non-recognized data type or expression with a composer;
   providing the non-recognized data type or expression to a composer when the compiler encounters the at least one non-recognized data type or expression;
   receiving information associated with translation of the non-recognized data type or expression from the composer;
   providing an intermediate representation of the source code file, the intermediate representation being based, at least in part, upon information received from the composer and
   compiling the intermediate representation of the source code to a computer executable form.

28. The method of claim 27, further comprising negotiating translation rights with the composer regarding a region of the source code file.

29. The method of claim 28, negotiating translation rights comprising an iterative process, wherein successively larger regions of the source code file are identified.

30. A computer readable medium storing computer executable components for a composer employed to provide additional translation logic to a programming language compiler comprising:
- a translation component that translates at least a region of a source code file based, at least in part, upon translation logic; and,
- a negotiation component that couples the composer with a compiler when the compiler encounters a data type associated with the composer within the region of the source code file.

31. A computer implemented composer employed to provide additional translation logic to a programming language compiler comprising the following means stored in a computer memory:
- means for translating at least a region of a source code file;
- means for coupling the composer with the compiler when the compiler encounters a data type associated with the composer within the region of the source code file; and,
- means for negotiating translation rights over the region of the source code file.

* * * * *

UNITED STATES PATENT AND TRADEMARK OFFICE
CERTIFICATE OF CORRECTION

| | | |
|---|---|---|
| PATENT NO. | : 7,441,237 B2 | Page 1 of 1 |
| APPLICATION NO. | : 10/396654 | |
| DATED | : October 21, 2008 | |
| INVENTOR(S) | : Matthew J. Warren | |

It is certified that error appears in the above-identified patent and that said Letters Patent is hereby corrected as shown below:

In column 14, line 13, in Claim 19, delete "ettor" and insert --error --, therefor.

Signed and Sealed this
Third Day of May, 2011

David J. Kappos
*Director of the United States Patent and Trademark Office*